UNITED STATES PATENT OFFICE.

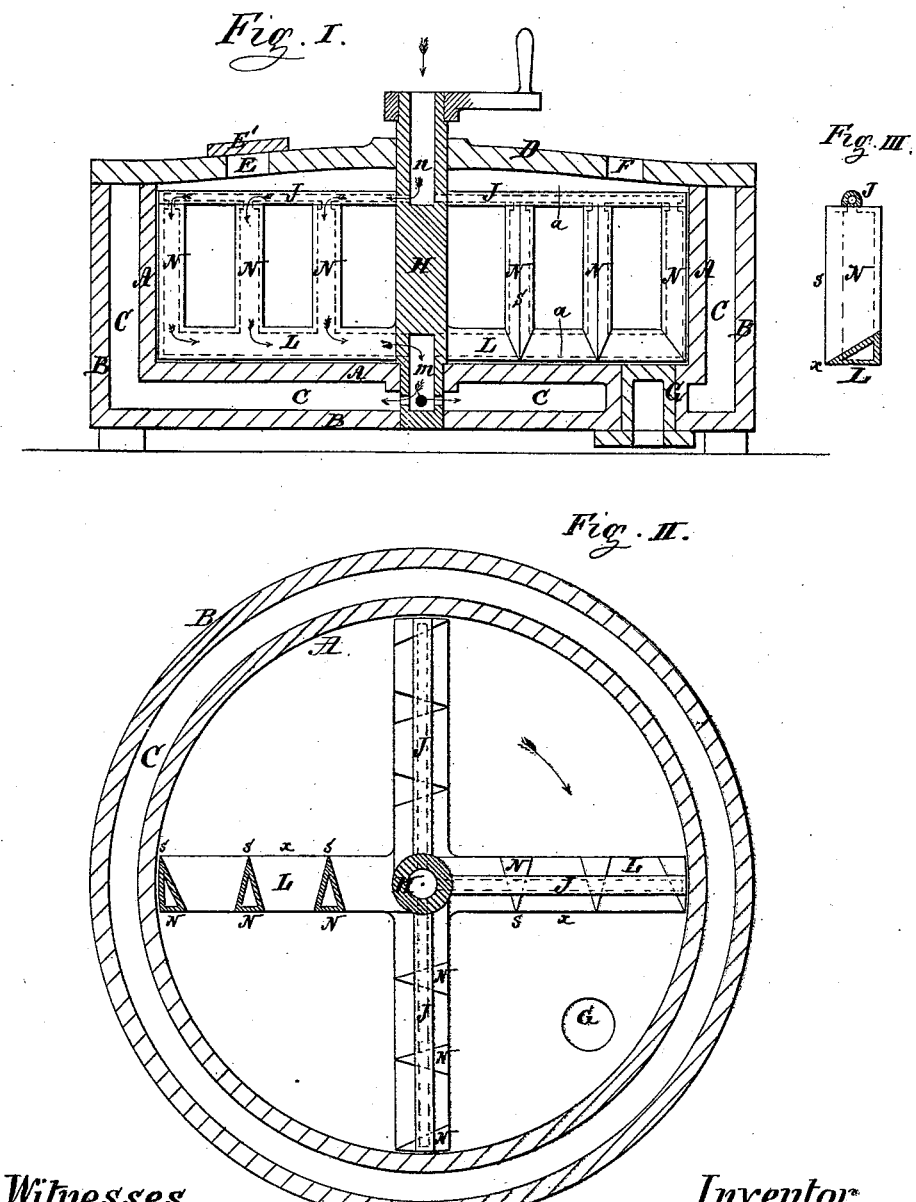

JOHN McLAREN, OF NEW YORK, N. Y.

IMPROVEMENT IN APPARATUS FOR TREATING ANIMAL MATTERS FOR FERTILIZERS.

Specification forming part of Letters Patent No. 217,701, dated July 22, 1879; application filed January 11, 1879.

*To all whom it may concern:*

Be it known that I, JOHN McLAREN, of New York, in the State of New York, have invented a new and useful Improvement in Apparatus for Treating Animal Matters for Fertilizers, of which the following is a specification.

This apparatus is for producing fertilizing material from animal matter; and consists in the arrangement of a cylinder, steam-jacketed at the sides and bottom, in combination with hollow revolving knife-blades to agitate and grind or cut up the animal matter in fine particles.

In the accompanying drawings, Figure I represents a longitudinal section of the apparatus. Fig. II is a horizontal section of the same; and Fig. III is a section of the knife-blades at line *a a*, Fig. 1.

A represents a cylinder, surrounded at its sides and bottom by another cylinder, B, forming a steam chamber, C, around its sides as well as on the bottom of the cylinder A, into which the steam is admitted, as will be hereinafter described. These cylinders A and B, as well as the steam-chamber C, are closed on the top by a cover, D, provided with two openings, E and F. The opening E, which is for the introduction of the animal matter, is arranged to be closed by a tight stopper or cap, E', and to the opening F a suitable pipe is connected to carry off the vapors from the animal matter during the process of converting the same into fertilizing material into a suitable condenser.

Through the bottoms of the cylinders an opening, G, capable of being closed by a suitable cap, is made for the removal of the material when the process is completed.

In the cylinder A a shaft, H, is arranged, the upper and lower part of which is made hollow. To the lower hollow part, *m*, of this shaft horizontal hollow arms L are attached, working close against the bottom of the cylinder A, having their forward edges, *x*, made sharp, similar to knife-blades. (See Fig. III.) To these arms L upright hollow arms N, having their forward edges, *s*, likewise made sharp, similar to knife-blades, are attached.

To the upper hollow part, *n*, of the shaft H tubes J are attached, connected with the hollow spaces of the upright hollow arms N.

The lower hollow space, *m*, of the shaft H connects with the steam-space C between the two cylinders.

To the upper end of the shaft H a steam-pipe is attached, the current of which, entering said shaft, passes through the pipes J into the upright hollow arms N, through the same into the horizontal hollow arms L, and then through the hollow parts *m* of the shaft into the steam-space C, as indicated by the arrows.

Suitable provision must be made at the bottom of the vessel B to allow the condensed water to escape. If necessary, the steam-space C may be supplied with live steam direct from the boiler.

The blood, fleshy, and other refuse matter to be converted into fertilizing material is placed into the cylinder A through the opening E, when the same is securely closed by its cap E'.

The shaft H, which turns in suitable bearings, and is capable of being rotated by means of any suitable power, is then put in motion, steam being at the same time admitted and caused to circulate through the same, the upright and horizontal arms, and within the steam-space C, as above described. The knife-shaped arms L and N will, during this rotation, gradually cut up and grind all this matter, while the steam, passing through the same and surrounding the cylinder on its sides and bottom, will evaporate all moisture introduced with the same, causing the offensive vapors to escape through the pipe attached to the opening F.

When the mass is reduced to dryness and thoroughly pulverized, which, in consequence of the knife-shaped arms, is accomplished in a very short time, the opening G, at the bottom of the cylinder, is opened and the material taken out of the same.

What I claim as my invention, and desire to secure by Letters Patent, is—

In a suitable jacketed vessel or cylinder A, the combination of a partially-hollow shaft, H, with tubes J, hollow knife-shaped arms L, and hollow knife-shaped uprights N, arranged to operate in the manner and for the purpose substantially as described.

JOHN McLAREN.

Witnesses:
HENRY E. ROEDER,
WILLIAM EHRET.